July 27, 1965 J. M. TERLATO ETAL 3,197,740
DATA STORAGE AND PROCESSING MACHINE
Filed Aug. 29, 1958
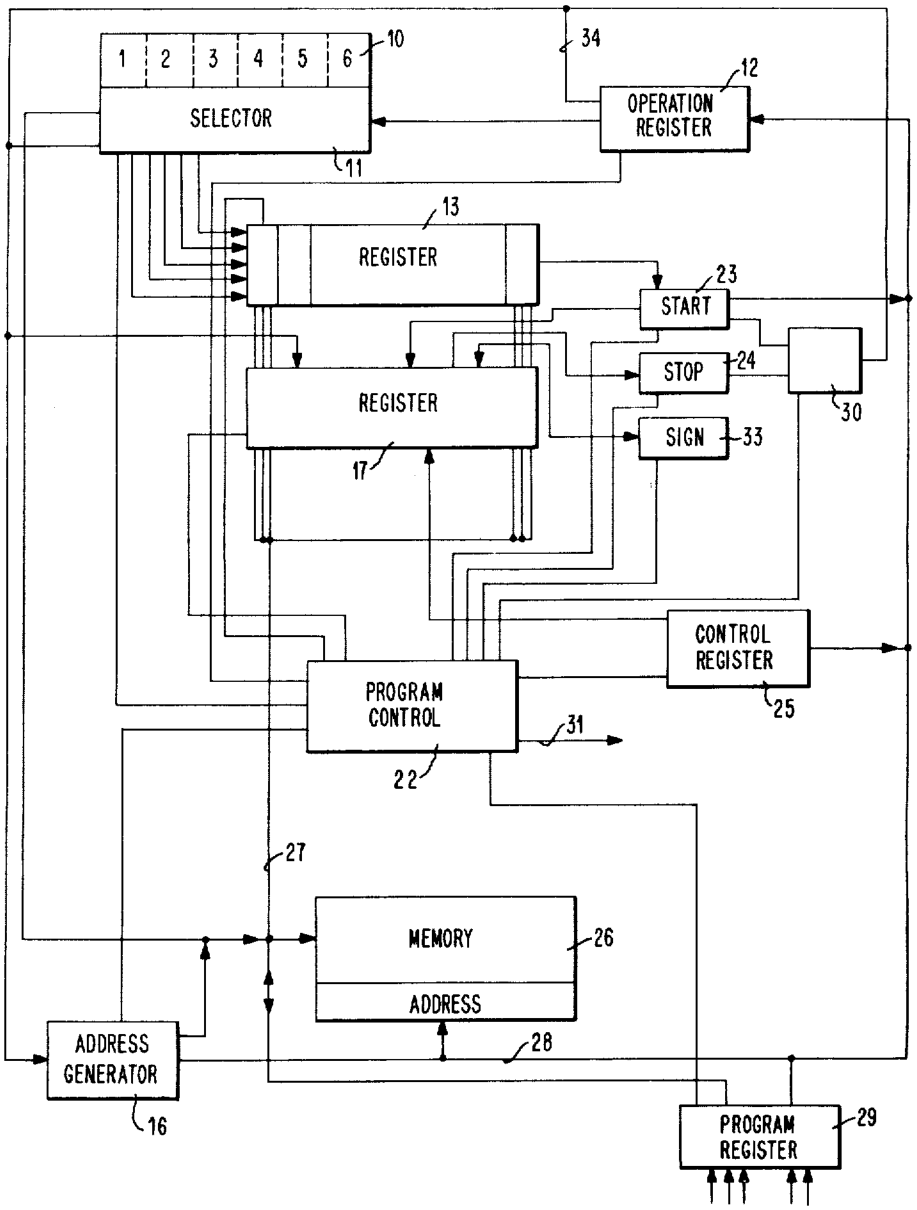
INVENTOR
JOSEPH M. TERLATO
BRUCE M. UPDIKE
BY William R. Barrett
ATTORNEY United States Patent Office 3,197,740
Patented July 27, 1965

3,197,740

DATA STORAGE AND PROCESSING MACHINE

Joseph M. Terlato, Bronx, and Bruce M. Updike, Endwell, N.Y., assignors to International Business Machines Corporation, New York, N.Y., a corporation of New York Filed Aug. 29, 1958, Ser. No. 758,062
3 Claims. (Cl. 340—172.5)

The invention relates to an apparatus for providing automatic operation of selected units of a stored program data storage and processing machine. In particular, this invention relates to apparatus for the automatic operation of peripheral equipment concurrently with the main program and the storage of certain factors in relation to this equipment both initially upon selection and terminally upon release. While this invention is related to all types of data storing peripheral equipment, such as tapes, discs, cards, etc., the discussion will be confined to tapes in the illustrative embodiment for ease in presentation.

One prior known data processing machine utilizing a stored instruction program of operations to be performed has utilized instructions contained in the main program for reading and checking the tape by means of various subroutines. For any of a given number of conditions which may occur, the programmer may provide suitable instructions for a correcting routine or a machine stop command. This is satisfactory except that the entire machine is stopped while portions of the machine are engaged in this error checking routine.

Other machines have provided for concurrent operation of the main program and the read in of data from peripheral equipment. When a predetermined data read-in operation had been completed, the main program could be interrupted to read the data into main memory or to do whatever other automatic operation was required. In the case of tape where the main program was interrupted, the next instruction was taken from an address in the main memory. As an example, the word contained in an address of 4000 might be for tape synchronizer 1 and contain the following data:

In the D address, which is a specified four digit portion of the word, there are contained the various instructions utilized in first selecting the tape. In the "I" portion of the word, which is the address of the next instruction and contains four digits, the fourth digit is a condition code automatically inserted by the machine which relates to that particular condition which caused the interrupt. The machine then goes to this "I" address at which is located a particular subroutine dealing with that condition.

The present invention utilizes status words to provide information for the programmer regarding the various conditions prior to and subsequent to the operation of selected units of equipment. These status words are stored in predetermined locations or addresses in memory which are related to the particular unit of equipment which has been selected. In certain instances, such as errors, the main routine of the data processing machine will be interrupted and the status words will be investigated to determine the error, and a particular subroutine for investigating the error will be selected. In other cases the program of the machine need not be interrupted, and the status words will remain for any necessary future use.

It is therefore an object of this invention to provide a novel combination of elements for achieving automatic operation of selected units of a data storage and processing machine.

Another object of this invention is to provide apparatus for the selective storage of information regarding the status of selected units of a data processing machine as an automatic operation of the machine.

A further object of this invention is to provide apparatus for utilizing stored information regarding selection and release of the various units of a data processing machine as an automatic operation in order to indicate to the machine the nature and extent of what has transpired.

Another and further object of this invention is to provide apparatus for forming and storing an initial status word indicative of the selection of a particular unit in a machine and a terminal status word indicative of the operation of the same particular unit in a machine.

Other objects of the invention will be pointed out in the following description and claims and illustrated in the accompanying drawing, which discloses, by way of an example, the principle of the invention and the best mode, which has been contemplated, of applying that principle.

In the drawing:

The figure is a schematic illustration of the invention.

In the description of the invention which follows, a detailed explanation of the exact structure of the component parts has not been given since the invention does not relate to the structure per se of each element but to the combination formed and the manner of cooperation. In the present state of the art of component parts necessary to do logical operations, there can be found numerous examples of most of the individual elements utilized. The circuits of the various elements which do not fall into particular specific groups could be determined by an engineer in the art by logical techniques in accordance with the conditions which will be given.

Since the invention is best described with the function of the elements shown already known and without reference to the particular structure contained therein, it has been thought to be expedient to list the nature of the elements first before proceeding with the general description of operation.

Peripheral equipment as shown at 10 includes magnetic tapes, magnetic discs, record cards, paper tapes, etc., plus all the other types of input/output equipment. Data processing machines utilize both input and output equipment for communication between programmers and machines, as well in some instances for the storage of data from intermediate operations.

The selector unit 11 selects a particular tape, 1–6, and performs a particular operation on the tape in accordance with an input from an operation register 12. The output from the selected tape, which is serial by digit and parallel by bit is transferred through the selector unit to a buffer shift register 13. A coded condition signal is also developed in relation to the operation of the tape for insertion in a register 17. The condition code from selector 11 is developed for some of the following types of errors and also for other conditions which are not errors but are conditions which should be detected. Errors are usually of the parity check type and other conditions would be similar to an end of file.

The shift register 13 is composed of ten stages of five bistable devices each plus one stage of three bistable devices for a sign. The input to this register from the selector unit is shifted until the buffer is filled, at which time each bistable device is read out in parallel into register 17. The shift register 13 is reset to zero.

The operation register 12 is composed of two stages of five bistable devices each plus one stage of three bistable devices for the sign and provides a static readout until reset by the program control 22.

The shift register 17 has fifty bistable devices plus three bistable devices for sign and provides a parallel readout. While this is a parallel operation, certain bistable devices may be selected and data entered into or obtained by the operation of program control 22.

The start shift register 23 contains twenty bistable dexices and provides a static readout to select a predetermined address in memory plus the ability to shift to or from the buffer 17. The stop register 24 contains twenty bistable devices which are set from the buffer register 17 and provide a static indication until reset. The sign register 33 contains three bistable devices and information may be moved to and from buffer 17. The control register 25 is identical to the start register 23.

Memory 26 is a large capacity data storage device having words of data stored in addressable data locations. Information is shown coming or leaving by one circuit 27, while a circuit for selecting that location is shown at 28. The bistable devices contained in the memory could be magnetic cores.

The address generator 16 or translator is a device for translating a series of signals from operation register 12 into a coded address for memory.

The program control 22 provides signals and controls for the operation of the various elements in a predetermined sequence.

The program register 29 provides a static indication of an instruction plus sign, until reset and contains fifty bistable devices plus three bistable devices for sign.

As mentioned previously the present invention provides both an initial and terminal status word as a result of the selection of peripheral equipment. For this particular explanation, only one group of tape units has been selected, although as pointed out previously, this invention is equally applicable to the other units of peripheral equipment.

For the particular group of tape units here represented, the initial status word will be stored in successive locations in accordance with the number of the tape drive. The final status word will be stored in a different group of successive locations in accordance with the same number.

If the main program of the computer is interrupted, the address of the active final status word will be stored in a particular location. The computer will transfer control to a particular sub-routine determined by the unit which caused the interruption. Since the initial and final status words are stored at predetermined constant locations, both are readily available to the programmer.

In the operation of a machine, an instruction containing ten digits plus sign, as follows:

S 0 1 2 3 4 5 6 7 8 9 would be divided into the following groups:

Digit S, sign, + represents an interrupt operation while — represents a no-interrupt operation
Digit 0 (tape control
Digit 1 operation code)
Digits 2–3, index word
Digit 4, operation (read, write, skip, etc.)
Digit 5, tape drive 1–6
Digits 6–9, address of record definition word Of these the most interesting is the address of the record definition word which states at which position in memory there is a word stored indicative of the start and stop locations in memory to which the information from the tape drive is to then be stored. When a read-in to the computer is described, it is understood that the same applies for a readout. The index word is indicative of how the record definition address is to be translated or indexed. This instruction above is entered into a program register 29 which stores the instruction as a static indication for use.

The sign (+ or —), tape drive, and operation number are read into an operation register 12 which selects the particular tape and operation and provides a storage of this information for the initial status word which will be formed in buffer 17.

The address of the record control word in the program register 29 is read into the buffer register 17 in original or indexed form dependent upon the digits 2 and 3 in response to a signal from program control 22. The location of the instruction now in the program register 29 plus one is also stored in buffer register 17. The information is transmitted by information bus 27 which contains the necessary number of wires. The format of the word now stored in buffer 17 is as follows:

Digit sign and digits 0 and 1 will have the operation code place therein from the operation register 12 by a wire 34 so that the operation to be performed; read, write, skip, etc., will be digit 1.

The information contained in digit places 6–9 is then read in to a control register 25 in response to controller 22 and will be used in a later operation.

The operation register 12 which forms a coded output in response to the code of a particular tape selected has its output translated by the control address generator 16 to a code suitable for selecting the particular memory location for storing the contents of buffer 17 which is the initial status word. The buffer register 17 is then read into memory at this selected location by information bus 27.

Control register 25 is then operated by controller 22 to select that word stored in memory by means of address bus 28 at the particular location designated by the record control word address stored in register 25. This gives the start and stop addresses plus sign in memory to which the information from the tape is to be stored or obtained. The information relative to start, stop, and sign is first routed into buffer 17 after which it is transmitted to the sign, start, and stop register, two digit places in this record definition word are not utilized. These four digit numbers are stored in the start and stop register to give the limits. When this operation is concluded and the controller 22 indicates this by a signal on line 31, the computer is restarted, and the tape or other apparatus is read or written concurrently with the operation of the main program.

Information from tapes or other peripheral equipment is read through the selector unit 11 to the buffer register 13, serially until the register is filled. After the register 13 is filled, the information is shifted in parallel to the register 17 which subsequently transmits it to memory over memory bus 27. Each time another word of information progresses through the buffer register 13, a signal is transmitted to the start register 23 by circuit 32 which raises the number contained therein by one. So long as the number stored in the start register 23 is not equal to the number in the stop register 24, there will be no output from the logical device 30, and the tape drive will read or write another word. The address of each word from buffer 17 to be inserted into memory 26 is determined by the start reading and is read over address line 28.

The logical device 30 utilizes the output from the stop and start register to determine as examples (1) If there is a correct length record, referring to the tape being read, by comparing the number in the start register which is the address of the current location in memory into which a word from tape is being read with the number in the stop register, which is the address of the last word in memory to which a word from tape is to be stored, and finding an equality at the end of the record time (2) Short length—when the start and stop addresses do not coincide prior to or at the end of record time (3) Long length record—when the start and stop addresses coincide prior to the end of record time.

From this device 30 a code representative of the condition present at the end of operations is stored in the buffer 17. This allows the programmer to determine the exact condition of the units concerned as well as to provide for corrective routines.

When there is an equality between start and stop, the sign contained in the register 33 will be tested. If the sign is minus, the operation will terminate; if the sign is plus, the number stored in control register 25 is to be upped by one and a new record control word is to be inserted into the start and stop register and the operation will continue.

When the operation is terminated, the contents of control register 25 are read into buffer 17 as well as the contents of the start register 23, sign register 33, and the condition code from logical device 30 or selector 11 so that the results:

| S | 0 | 1 | 2345 | 6789 |
|---|---|---|---|---|
| + or − | 0 | condition | start | contents of control register A |

The operation register 11 in response to the program control 22 transmits an output to address generator 16 which is translated into an address memory of the contents of buffer 17, which is the final status word. The program control 22 interprets this word as initial or final and stores it in the proper location. The address of this word is stored in a fixed memory location when the interrupt caused by the condition on this unit occurs.

If the instruction for controlling the particular unit of peripheral equipment had a plus sign (for interrupt), the main program of the machine will stop at the proper time, and the program register will be set to an address determined by the type of equipment causing the interrupt. This will also occur automatically for errors regardless of the sign of the initiating instruction.

From the final status word and from the initial status word, located a predetermined number of locations apart, enough information is available to allow proper programming to correct for any condition indicated by the condition code. It will be remembered that there was an initial instruction which caused the operation of the peripheral equipment, and this instruction location can be written as:

XXX0—read tape

The number stored in the initial status word was this number XXX0 plus 1 or XXX1. In the operation of the machine, the instruction XXX1 may be an unconditional branch to an instruction XX10 which is a continuation of the main program. The condition codes as recited previously are assigned numbers, as for example:

1—error
2—correct length record

If the address of a subroutine is placed in locations XXX2 for an error, XXX3 for a correct length error, etc., the particular subroutine for a particular condition may be selected by adding the condition code plus the number stored in the initial status words.

The initial status word also contains the operation of the unit and the address of the initial record definition word. The final status word also contains the address of the final record definition word plus the last memory address into which data has been read. With this data the exact point of error can be determined.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing machine utilizing a series of instructions for operation of said machine and including a plurality of peripheral units operated under control of said series of instructions, (a) a plurality of selectable storage locations for the storage of data, (b) an operation register for storing data indicative of the operation to be performed by said data processing machine and said peripheral units, (c) a condition register for storing condition data respecting the transfer of data between selected units of said data processing machine, (d) a first and second address register intended in said data processing machine for storing address data respecting the transfer of data between various units of the machine, (e) and a program control means for controlling said data processing machine and operable in response to the termination of an operation to select a plurality of storage locations responsive to data stored in said operations register and transfer the data in said condition register and address registers into said plurality of storage locations.

2. In a data processing machine utilizing a main program of instructions for operation of said machine and including peripheral units operable concurrently with the operation of said data processing machine under control of said main instruction program, (a) a plurality of selectable storage locations for the storage of data, (b) an operation register for receiving and storing instruction data respecting the operation of a peripheral unit, (c) means connected to said operation means and responsive to the data therein to control said peripheral unit, (d) a condition register included in said data processing machine for storing condition data respecting the transfer of data between said data processing machine and said peripheral unit, (e) a first and second address register intended in said data processing machine for storing address data of the storage locations between which the transfer of data between various units of the machine will take place, (f) and a program control means for controlling said data processing machine and operable in response to the termination of an operation to select a plurality of storage locations responsive to data stored in said operations register and transfer the data in said condition register and address registers into said plurality of storage locations.

3. In a data processing machine utilizing a series of instructions for operation of said machine and including a plurality of peripheral units operated under control of said series of instructions, (a) a plurality of selectable storage locations for the storage of data, (b) an operation register for storing data indicative of the operation to be performed by said data processing machine and said peripheral units, (c) a program register for receiving instruction data respecting the operation of the machine, (d) a program control means for transferring data in said program register into said operation register, (e) means connected to said operation means and responsive to the data therein to control said peripheral units, (f) a condition register included in said data processing machine for storing condition data respecting the transfer of data between said data processing machine and said peripheral unit, (g) a first and second address register intended in said data processing machine for storing address data of the storage locations between which the transfer of data between various units of the machine will take place, (h) said program control means being responsive to the termination of an operation to select a plurality of storage locations selected by the operation data in said operation register and transfer the data in said condition register and address registers into said plurality of storage locations.

(References on following page)

References Cited by the Examiner

UNITED STATES PATENTS

| | | | |
|---|---|---|---|
| 2,800,277 | 7/57 | Williams | 340—174 |
| 2,874,901 | 2/59 | Holmes | 340—174 |
| 2,885,659 | 5/59 | Spielberg | 340—172.5 |
| 2,968,027 | 1/61 | McDonnell et al. | 340—172.5 |
| 3,029,414 | 4/62 | Schrimpf | 340—172.5 |
| 3,061,192 | 10/62 | Terzian | 235—157 |

OTHER REFERENCES

Handbook of Automation, Computation and Control by Grabbe, Ramo and Woolridge, Vol. II, pages 2–144 and 145 and 2–190 to 2–196, 1959.

MALCOLM A. MORRISON, *Primary Examiner.*

IRVING L. SRAGOW, STEPHEN W. CAPELLI, *Examiners.*